(12) United States Patent
Minamida et al.

(10) Patent No.: US 11,442,461 B2
(45) Date of Patent: Sep. 13, 2022

(54) MOBILE VEHICLE

(71) Applicant: KABUSHIKI KAISHA TOYOTA JIDOSHOKKI, Kariya (JP)

(72) Inventors: Masaya Minamida, Kariya (JP); Takuto Mihoichi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 241 days.

(21) Appl. No.: 16/652,828

(22) PCT Filed: Sep. 10, 2018

(86) PCT No.: PCT/JP2018/033354
§ 371 (c)(1),
(2) Date: Apr. 1, 2020

(87) PCT Pub. No.: WO2019/069626
PCT Pub. Date: Apr. 11, 2019

(65) Prior Publication Data
US 2020/0319645 A1 Oct. 8, 2020

(30) Foreign Application Priority Data

Oct. 6, 2017 (JP) .............................. JP2017-196216

(51) Int. Cl.
*G05D 1/02* (2020.01)
*G05D 1/12* (2006.01)
*G05D 1/00* (2006.01)

(52) U.S. Cl.
CPC ........... *G05D 1/024* (2013.01); *G05D 1/0088* (2013.01); *G05D 1/12* (2013.01)

(58) Field of Classification Search
CPC ......... G05D 1/024; G05D 1/0088; G05D 1/12
See application file for complete search history.

(56) References Cited

U.S. PATENT DOCUMENTS

| | | | |
|---|---|---|---|
| 8,510,029 B2* | 8/2013 | Curtis | G05D 1/024 701/301 |
| 9,798,324 B2* | 10/2017 | Nevdahs | G05D 1/00 |
| 11,000,944 B2* | 5/2021 | Asada | B62D 57/032 |
| 2004/0073368 A1* | 4/2004 | Gonzalez-Banos | G05D 1/12 701/301 |

(Continued)

FOREIGN PATENT DOCUMENTS

| | | | | |
|---|---|---|---|---|
| CN | 102183960 B | | 7/2013 | |
| JP | 2004-126802 A | | 4/2004 | |
| JP | 2010238132 A | * | 10/2010 | ........... G05D 1/0212 |

OTHER PUBLICATIONS

International Search Report for PCT/JP2018/033354 dated Dec. 4, 2018 (PCT/ISA/210).

*Primary Examiner* — Hunter B Lonsberry
*Assistant Examiner* — Harrison Heflin
(74) *Attorney, Agent, or Firm* — Sughrue Mion, PLLC (57) ABSTRACT

A mobile vehicle includes one or more wheels, a sensor configured to detect the position of a follow target, and a controlling section configured to control the one or more wheels based on a detection result of the sensor such that the mobile vehicle follows the follow target. The controlling section is configured to determine a change point at which the traveling direction of the follow target has changed based on the detection result of the sensor, and to set a target point based on the change point.

13 Claims, 11 Drawing Sheets

(56) References Cited

U.S. PATENT DOCUMENTS

| | | | |
|---|---|---|---|
| 2006/0106496 A1* | 5/2006 | Okamoto | G05D 1/0278 |
| | | | 700/253 |
| 2016/0188977 A1* | 6/2016 | Kearns | H04N 7/185 |
| | | | 348/113 |
| 2016/0287193 A1 | 10/2016 | Katsumata | |
| 2017/0134631 A1* | 5/2017 | Zhao | G05D 1/12 |
| 2017/0368690 A1* | 12/2017 | Li | G05D 1/0223 |
| 2018/0039281 A1* | 2/2018 | Lee | G05D 1/0274 |
| 2019/0008248 A1* | 1/2019 | Kovtun | G05D 1/0242 |

* cited by examiner

Legends
○ : Machine base
◐ : Follow target
— : Traveling path of follow target

MOBILE VEHICLE

CROSS REFERENCE TO RELATED APPLICATIONS

This application is a National Stage of International Application No. PCT/JP2018/033354 filed Sep. 10, 2018, claiming priority based on Japanese Patent Application No. 2017-196216 filed Oct. 6, 2017.

TECHNICAL FIELD

The present invention relates to a mobile vehicle that follows a follow target detected by a sensor.

BACKGROUND ART

Patent Document 1 discloses a transfer robot that recognizes a transfer worker and follows the transfer worker while keeping a predetermined distance to the transfer worker. When following the transfer worker, the transfer robot detects the transfer worker and obstacles in the surroundings using a detecting section. When stopping being able to recognize the transfer worker, the transfer robot recognizes the existence of a corner in the vicinity of that spot and turns the corner.

PRIOR ART DOCUMENT

Patent Document

Patent Document 1: Japanese Laid-Open Patent Publication No. 2004-126802

SUMMARY OF THE INVENTION

Problems that the Invention is to Solve

Figure 15:
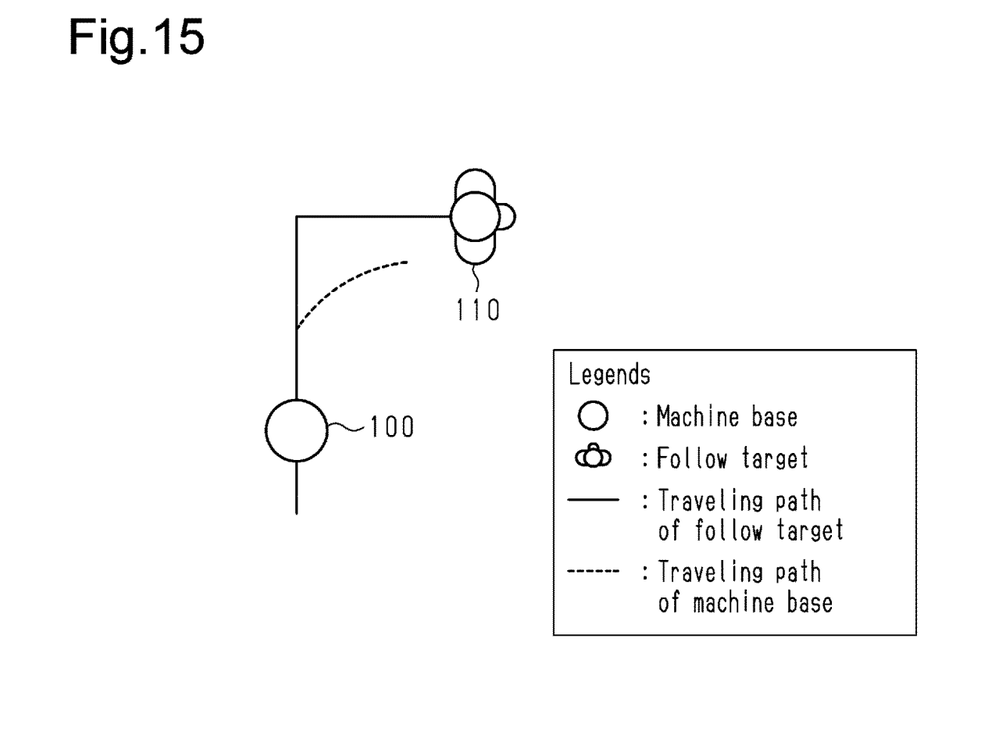
FIG. 15 is a schematic plan view illustrating traveling paths of a follow target and a machine base.
Figure 16A:
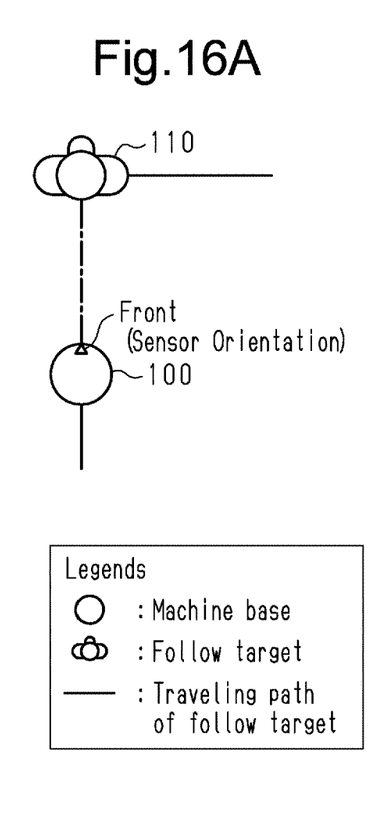
FIGS. 16A, 16B, 16C, and 16D are schematic plan views illustrating changes in the position of a machine base that follows a follow target at a corner.
Figure 16B:
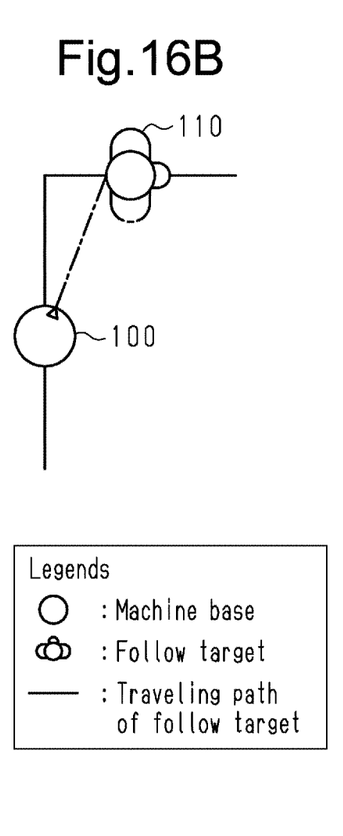
Figure 16C:
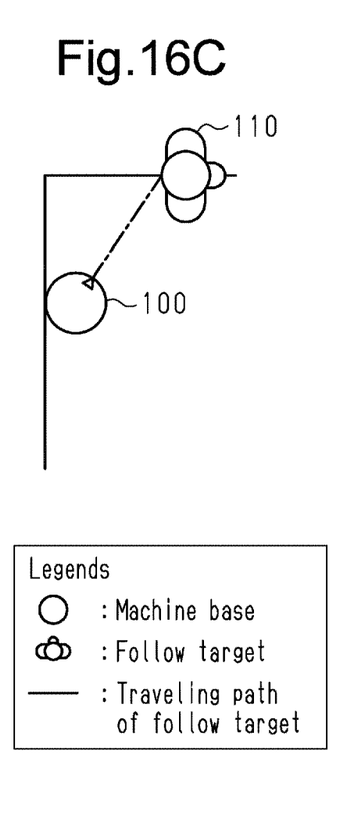
Figure 16D:
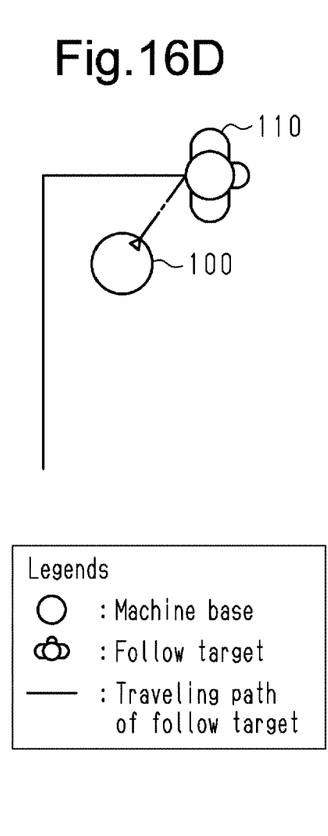

This type of mobile vehicle is configured to stop when there is an obstacle in the traveling path. In FIG. 15, the solid line indicates the traveling path of a follow target 110 when turning a corner. The broken line indicates the traveling path of a machine base 100 that recognizes the follow target 110 with a sensor, for example, a laser sensor, and follows the follow target 110. When the follow target 110 changes the traveling direction by 90 degrees at the corner, the machine base 100 takes the shortest path toward the follow target 110. Accordingly, the machine base 100 advances along a path different from the path of the follow target 110 by taking a shortcut of the right angle path. Specifically, the follow target 110 travels in a straight line to the corner and changes the traveling direction at the corner as shown in FIG. 16. Thereafter, the machine base 100 gradually changes its traveling direction to move toward points on the traveling path of the follow target 110 respectively shown in FIGS. 16B, 16C, and 16D. Thus, the machine base 100 follows the follow target 110 in the smallest distance without moving along the corner.

Figure 17:
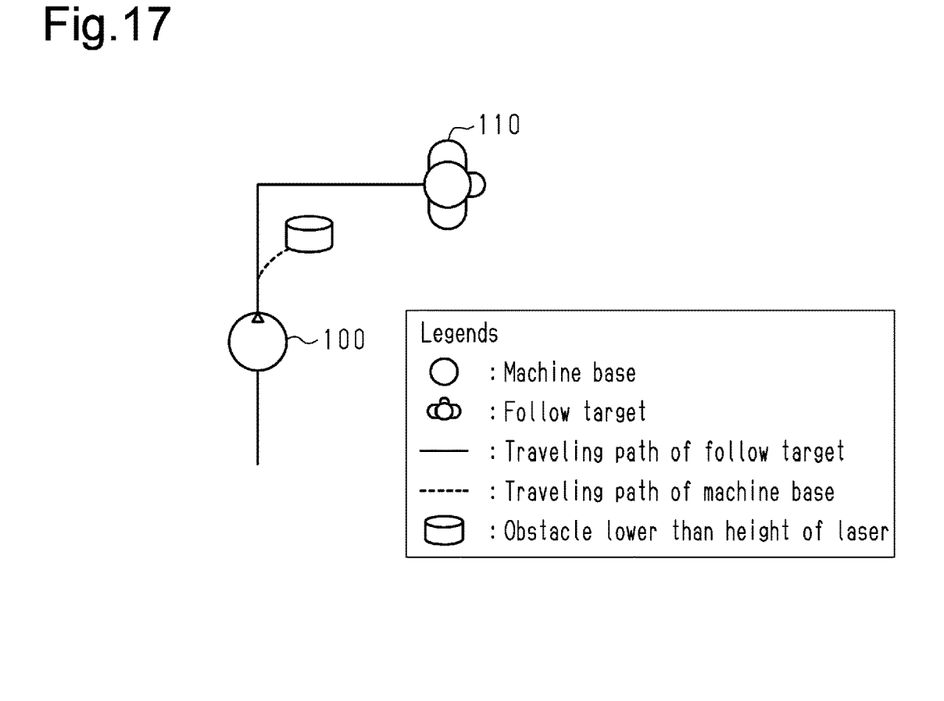
FIG. 17 is a schematic plan view illustrating an example in which a machine base takes a shortcut of the traveling path of a follow target and hits an obstacle.
Figure 18A:
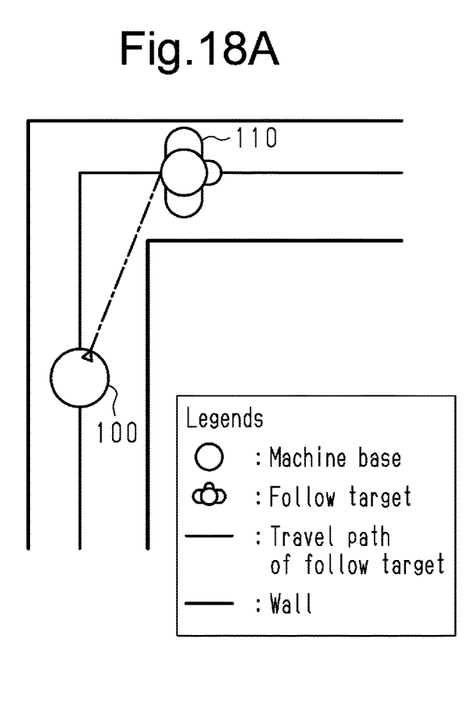
FIG. 18A is a schematic plan view showing a machine base that follows a follow target that has turned a corner.
Figure 18B:
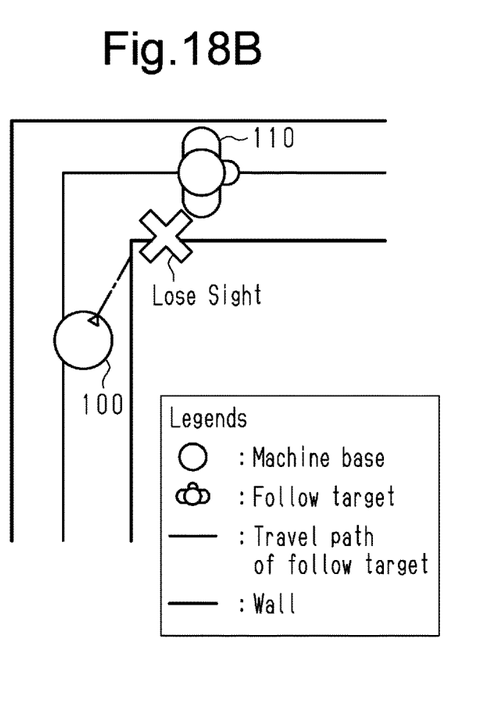
FIG. 18B is a schematic plan view showing the machine base that has lost sight of the follow target.

When advancing along a path different from the path of the follow target 110 as indicated by the broken line in FIG. 15, the machine base 100 may hit an obstacle as shown in FIG. 17. For example, if an obstacle is located at a position lower than the irradiation height of the laser, the sensor cannot detect the obstacle. In this case, the machine base 100 may hit or run onto the obstacle. Also, in a case in which there is a restricted area, for example, in a factory, if the follow target 110, which is a person, turns a corner of the restricted area, the machine base 100 may enter the restricted area. Further, at a blind corner as shown in FIGS. 18A and 18B, the machine base 100 may lose sight of the follow target 110.

It is an objective of the present invention to provide a mobile vehicle that follows a follow target while following along the path of the follow target.

Means for Solving the Problems

In accordance with a present disclosure, a mobile vehicle includes one or more wheels, a sensor configured to detect a position of a follow target, and a controlling section configured to control the one or more wheels based on a detection result of the sensor such that the mobile vehicle follows the follow target. The controlling section is configured to determine a change point at which a traveling direction of the follow target has changed based on the detection result of the sensor, and set a target point based on the change point.

When recognizing a change in the traveling direction of the follow target based on the detection result of the sensor, the controlling section of the above-described mobile vehicle sets a target point based on the change point. Since there is no obstacle on the path through which the follow target has traveled, the mobile vehicle can follow the follow target while following along the path of the follow target.

The controlling section may be configured to store in a memory pieces of positional data of the follow target that have been detected by the sensor at predetermined time intervals, and determine the change point based on the pieces of the stored positional data.

A coordinate system may be defined in which a directional axis from the mobile vehicle toward the follow target is a first axis, and a directional axis orthogonal to the first axis is a second axis, and the controlling section may exclude, from candidates for the change point, a position at which an absolute value of a coordinate on the second axis is smaller than or equal to a threshold on the coordinate system.

The controlling section may be configured to determine that the change point is a position that corresponds to one of the pieces of the stored positional data and meets one or more conditions.

A coordinate system may be defined in which a directional axis from the mobile vehicle toward the follow target is a first axis, and a directional axis orthogonal to the first axis is a second axis, and the one or more conditions may include a condition that an absolute value of a coordinate on the second axis is greatest on the coordinate system.

A coordinate system may be defined in which a directional axis from the mobile vehicle toward the follow target is a first axis, and a directional axis orthogonal to the first axis is a second axis, and the one or more conditions may include a condition that an absolute value of a coordinate on the second axis is greater than a threshold on the coordinate system.

The one or more conditions may include that a distance from the mobile vehicle is greater than or equal to a predetermined distance.

The controlling section may be configured to set the target point to a position that is advanced from the change point by a specified distance.

The controlling section may be configured to stop traveling of the mobile vehicle toward the target point when a distance from the mobile vehicle to the target point is smaller than or equal to the specified distance.

The controlling section may be configured to cause, when the distance from the mobile vehicle to the target point is greater than the specified distance and smaller than or equal to a speed determination distance, the mobile vehicle to travel toward the target point at a higher speed as the distance to the target point increases.

The controlling section may be configured to cause, when the distance from the mobile vehicle to the target point is greater than the speed determination distance and smaller than or equal to a stopping determination distance, the mobile vehicle to travel toward the target point at a constant speed equal to that in a case in which the distance to the target point is equal to the speed determination distance.

The controlling section may be configured to stop traveling of the mobile vehicle toward the target point when the distance from the mobile vehicle to the target point is greater than the stopping determination distance.

The one or more wheels may include a plurality of omnidirectional wheels, and the controlling section may be configured to control the omnidirectional wheels such that the follow target is located in front of the mobile vehicle.

The target point may be a target point of traveling and is set at a position different from a current position of the follow target so as to cause the mobile vehicle to change the traveling direction at the change point. The controlling section may be configured to cause the mobile vehicle to travel toward the follow target when the change point is not determined, and cause the mobile vehicle to travel toward the target point that is set based on the change point when the change point is determined.

MODES FOR CARRYING OUT THE INVENTION

One embodiment of the present invention will now be described with reference to the drawings.

Figure 1:
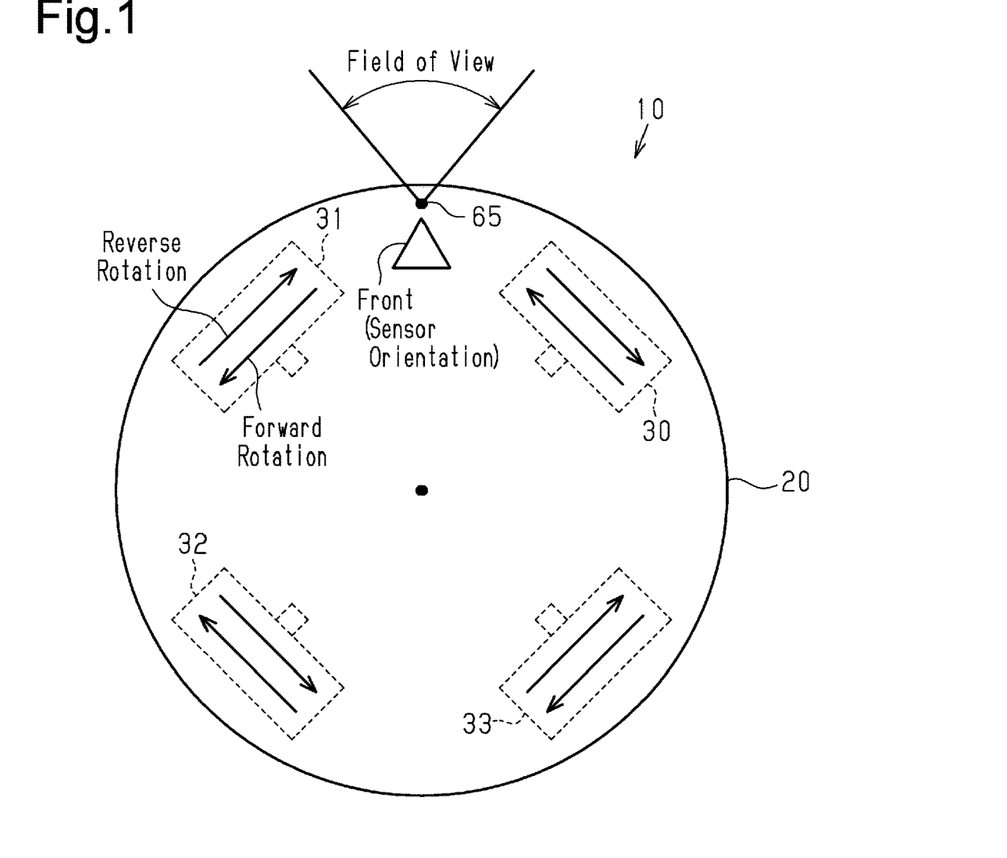
FIG. 1 is a schematic plan view of a mobile vehicle according to an embodiment.

As shown in FIG. 1, a vehicle 10 is an omnidirectional vehicle. The vehicle 10 includes a machine base 20 and four wheels 30, 31, 32, 33. The four wheels 30, 31, 32, 33 are attached to the machine base 20. Specifically, the wheels 30, 31, 32, 33 are arranged at every 90 degrees about the center of the machine base 20 in a plan view. The wheels 30, 31, 32, 33 are omnidirectional wheels, for example, omni wheels. The wheels 30, 31, 32, 33 are configured to be driven in all directions. That is, each wheel has multiple rollers (barrel-shaped small wheels), which are arranged along the circumference and freely rotational. This allows the wheel to move freely forward, backward, leftward, and rightward. The vehicle 10 is configured to move the machine base 20 in any direction by using the four wheels having the above-described configuration without shifting the axles.

A sensor 65 is attached to the machine base 20. The sensor 65 has a field of view of a predetermined angle in the horizontal direction (detection range). The sensor 65 is fixed to the front side of the machine base 20 so that the field of view matches with the front of the machine base 20. The sensor 65 is a distance sensor that uses a laser range finder (LRF). The sensor 65 detects the position of a follow target 70 (refer to FIG. 5) at predetermined time intervals.

Figure 2:
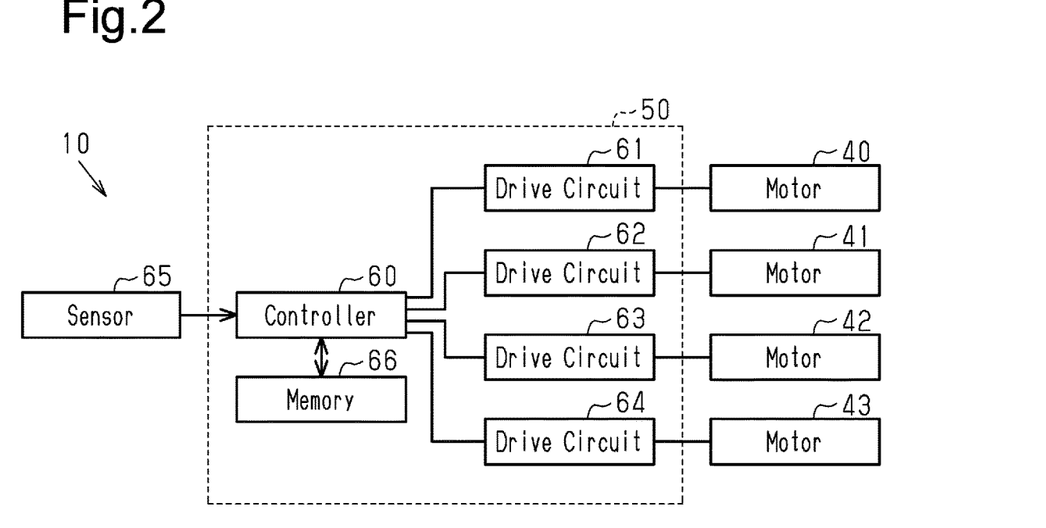
FIG. 2 is a block diagram of the vehicle of FIG. 1.

As shown in FIG. 2, the vehicle 10 includes motors 40, 41, 42, 43 and a drive circuit 50. The motors 40, 41, 42, 43 and the drive circuit 50 are mounted on the machine base 20. The output shafts of the motors 40, 41, 42, 43 are respectively coupled to the corresponding wheels 30, 31, 32, 33 to transmit drive force. The motors 40, 41, 42, 43 respectively drive the wheels 30, 31, 32, 33.

The drive circuit 50 includes a controller 60, which is a controlling section, drive circuits 61, 62, 63, 64, and a memory 66. The controller 60 is constituted as a computer including a CPU and memories (a ROM 54 and a RAM) and executes various types of control by executing programs stored in the memories using the CPU. The memories, or computer readable media, include any type of media that are accessible by general-purpose computers and dedicated computers.

The controller 60 is not limited to one that performs software processing on all processes executed by itself. For example, the controller 60 may include dedicated hardware circuit (for example, an application specific integrated circuit: ASIC) that executes at least part of the processes executed by itself. That is, the controller 60 may be circuitry including 1) one or more processors that operate according to a computer program (software), 2) one or more dedicated hardware circuits that execute at least part of various types of processes, or 3) a combination thereof.

The controller 60 receives detection signals from the sensor 65. The detection signal of the sensor 65 contains information of detected objects around the vehicle 10 including a follow target.

The drive circuit 61 activates the motor 40, which in turn rotates the wheel 30. The drive circuit 62 activates the motor 41, which in turn rotates the wheel 31. The drive circuit 63 activates the motor 42, which in turn rotates the wheel 32. The drive circuit 64 activates the motor 43, which in turn rotates the wheel 33.

The controller 60 controls the respective motors 40, 41, 42, 43 via the corresponding drive circuits 61, 62, 63, 64. Accordingly, the corresponding wheels 30, 31, 32, 33 rotate to cause the machine base 20 to move forward, rearward, leftward, or rightward, or revolve.

The vehicle 10, which is an omnidirectional vehicle, follows a follow target detected by the sensor 65 by using the controller 60 that controls the omnidirectional wheels 30 to 33 based on measurement results (detection results) of the sensor 65. The follow target may be a person (follow-target person) or an object such as a vehicle (follow-target object). The sensor 65 detects the position of the follow target and obstacles in the detection range.

An operation of the vehicle 10 will now be described.

Figure 3A:
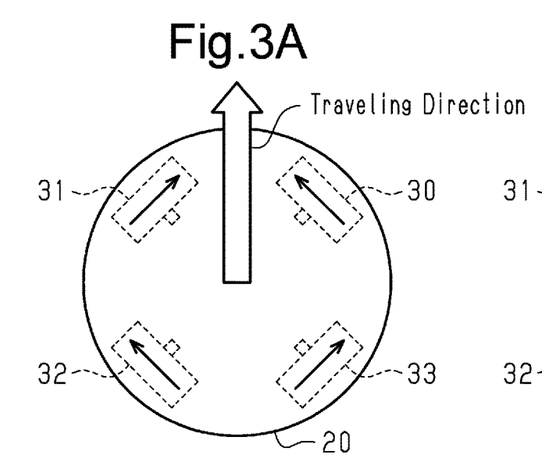
FIGS. 3A to 3E are schematic plan views illustrating motions of the vehicle of FIG. 1.
Figure 3B:
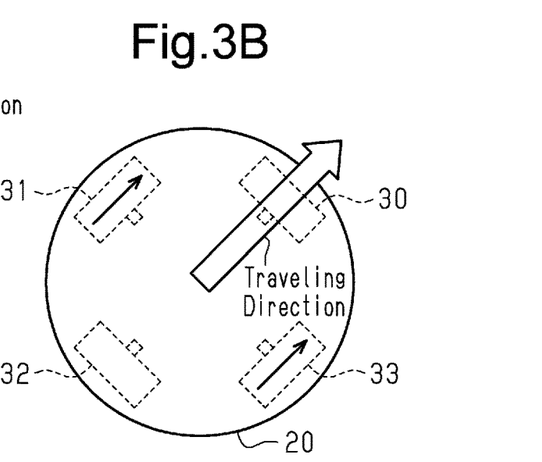
Figure 3C:
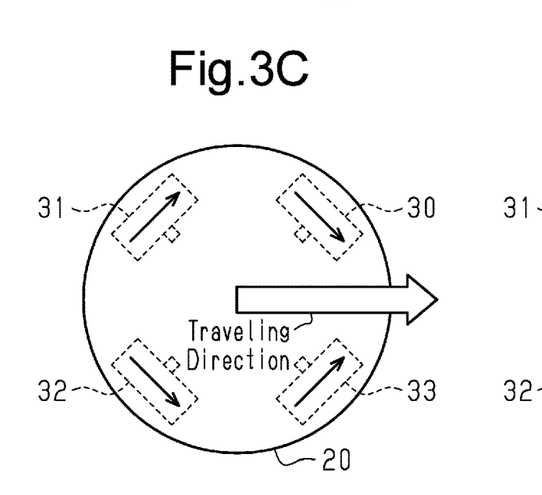
Figure 3D:
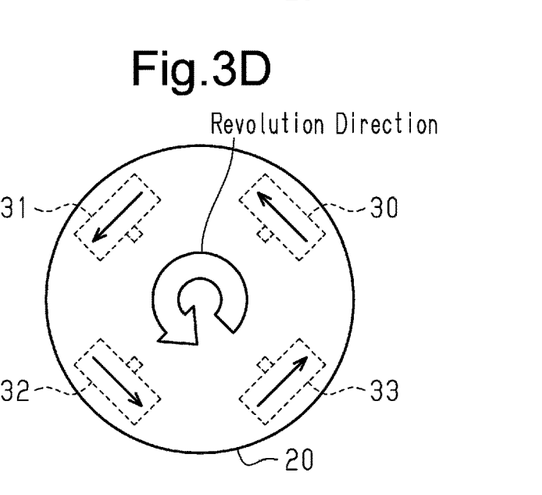

The four-omni wheel vehicle 10, which is an omnidirectional vehicle, is capable of performing free motions including translation, revolution, and diagonal motion. For example, the vehicle 10 is capable of moving as shown in FIGS. 3A, 3B, 3C, 3D, and 3E. The machine base 20 advances forward when the wheels 30, 33 rotate in the forward direction and the wheels 31, 32 rotate in the reverse direction as shown in FIG. 3A. The machine base 20 moves diagonally when the wheel 31 rotates in the reverse direction and the wheel 33 rotates in the forward direction with the wheels 30, 32 in a stopped state as shown in FIG. 3B. The machine base 20 moves sideways when the wheels 30, 31 rotate in the reverse direction and the wheels 32, 33 rotate in the forward direction as shown in FIG. 3C. The machine base 20 revolves when the wheels 30, 31, 32, 33 rotate in the forward direction as shown in FIG. 3D.

Figure 3E:
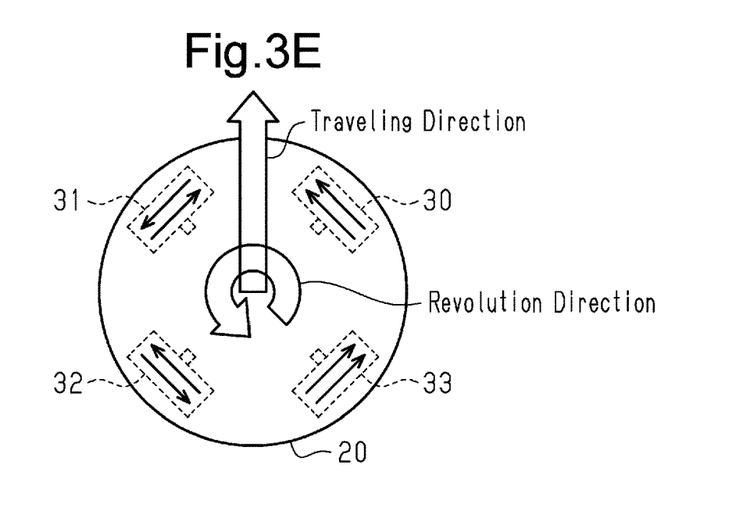

The machine base 20 revolves while advancing forward when the wheels 30, 33 rotate in the forward direction and the wheels 31, 32 rotate at predetermined speeds as shown in FIG. 3E. In this manner, the vehicle 10 is capable of performing combination of translation and revolution, that is, moving while causing the machine base 20 to revolve.

Figure 5:
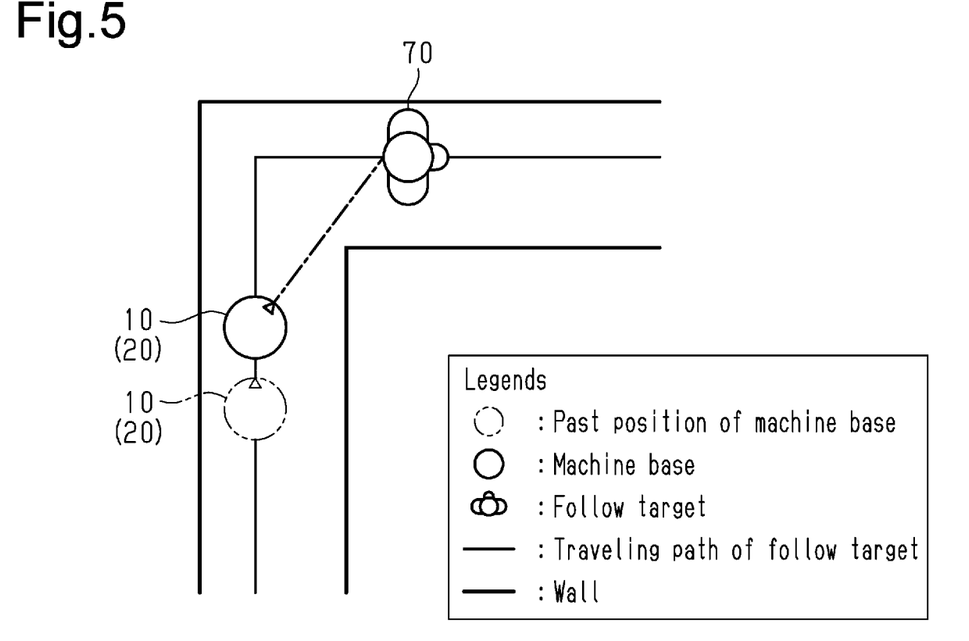
FIG. 5 is a schematic plan view showing a case in which the vehicle of FIG. 1 follows along the traveling path of the follow target at a corner.

Thus, when following the follow target 70 that is advancing along a path including a corner as shown in FIG. 5, the vehicle 10 is capable of moving while causing the machine base 20 to revolve so as to constantly capture the follow target 70 in front, which is the detection direction.

In this manner, the vehicle 10 moves while taking the field of view of the sensor 65 into consideration. Taking advantage of the characteristics of being an omnidirectional vehicle, the controller 60 controls the omnidirectional wheels 30, 31, 32, 33 such that the sensor 65 maintains the position (orientation) to be within the field of view of the follow target 70 as shown in FIG. 5. Specifically, while the vehicle 10 follows the follow target 70, the controller 60 controls the wheels 30, 31, 32, 33 such that the follow target 70 is located in front of the machine base 20, thereby changing the orientation (position) of the machine base 20 such that the follow target 70 is located in front of the machine base 20.

Figure 6:
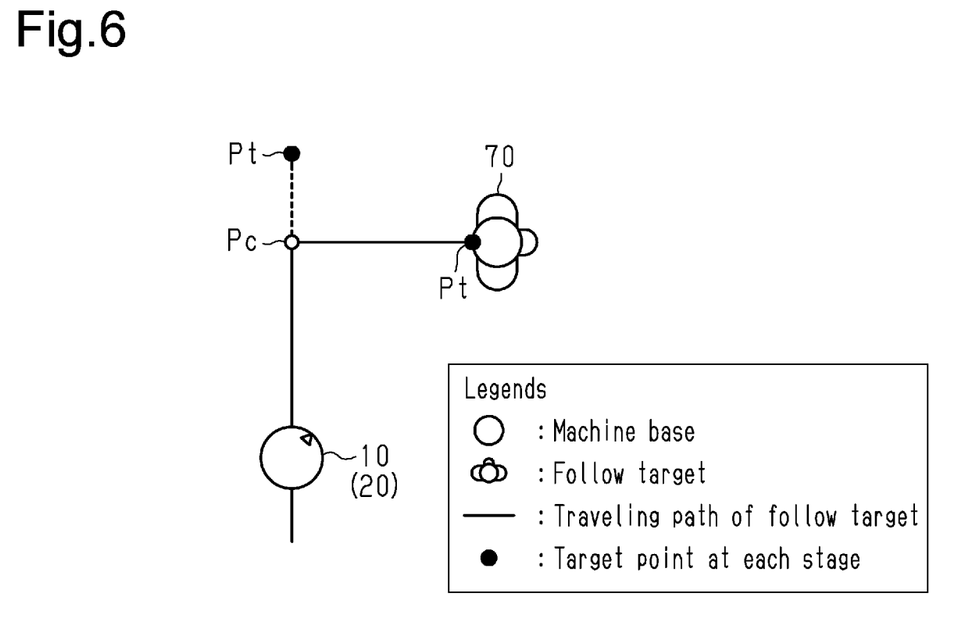
FIG. 6 is a schematic plan view illustrating the setting of a target point of the vehicle of FIG. 1.

The controller 60 is configured to determine a change point Pc, at which the traveling direction of the follow target 70 has changed, based on the detection result of the sensor 65. The controller 60 is configured to set a target point Pt (refer to FIG. 6) based on the change point Pc (refer to FIG. 9A). The target point Pt is a target point of traveling and is set at a position different from the current position of the follow target 70 so as to cause the vehicle 10 to change the traveling direction at the change point Pc.

Figure 7A:
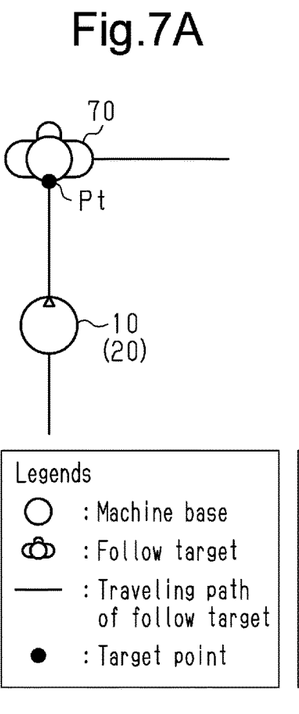
FIGS. 7A, 7B, and 7C are schematic plan views illustrating the setting of the target point at the respective stages.
Figure 7B:
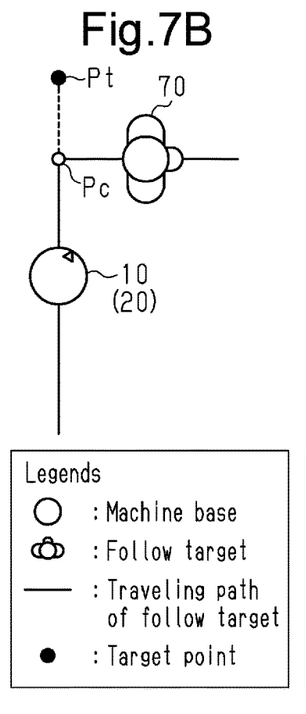
Figure 7C:
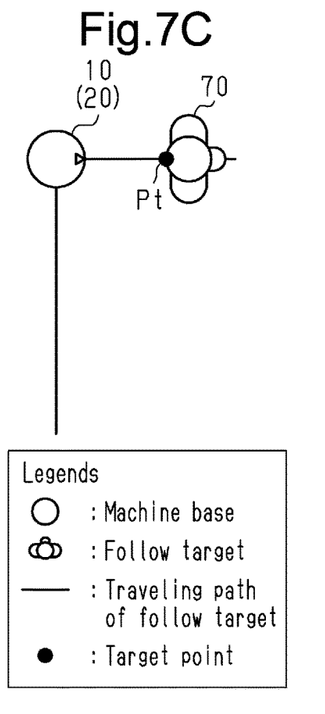

FIGS. 7A, 7B, 7C show the traveling paths of the follow target 70 and the mobile vehicle 10. FIG. 7A shows a stage at which the follow target 70 has reached a corner. At this stage, the target point Pt is set on the follow target 70. FIG. 7B shows a stage at which the follow target 70 has changed the traveling direction at the corner. At this stage, the vehicle 10 is moving toward the target point Pt, which has been set based on the change point Pc. FIG. 7C shows a stage at which the vehicle 10 has reached the change point Pc. At this stage, the controller 60 puts the target point Pt back onto the follow target 70 and restarts following the follow target 70.

Figure 8:
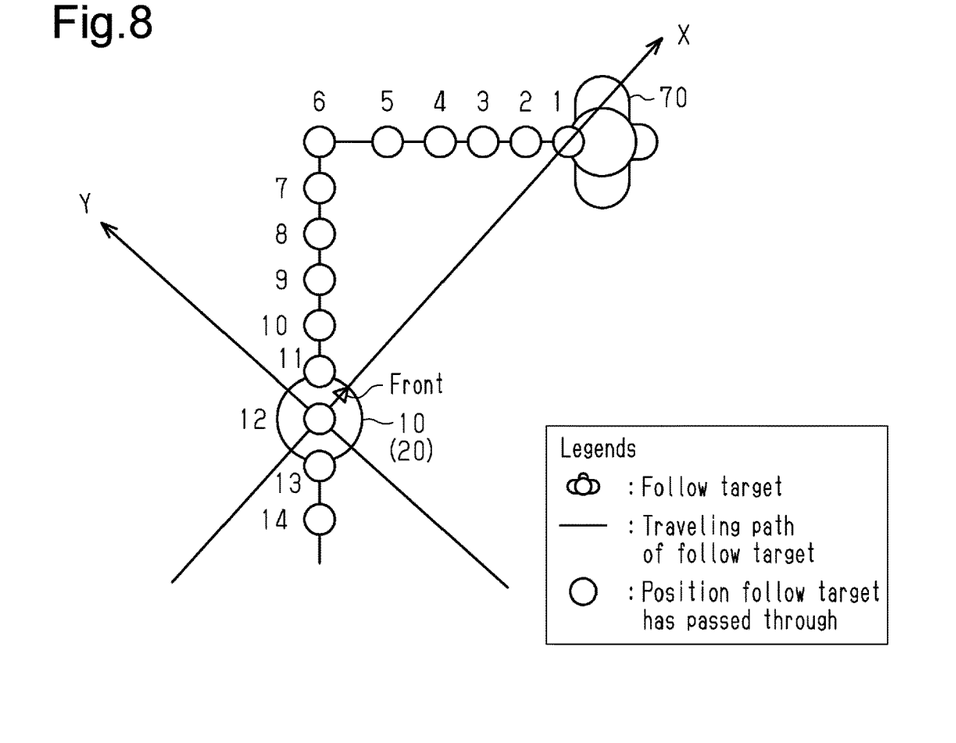
FIG. 8 is a schematic plan view illustrating the coordinates of positions through which the follow target has traveled.

In FIG. 8, Position 1 indicates the current position of the follow target 70. Positions 2 to 14 are past positions of the follow target 70 that go back in order from Position 1. Positions 2 to 14 were recorded every 50 msec.

The controller 60 is configured to store positional data of the follow target 70 that is detected at predetermined time intervals (every 50 msec) in the memory 66 and to determine the change point Pc based on the pieces of the stored positional data. The pieces of past positional data (coordinates) of the follow target 70 are retained on a relative coordinate system that is defined with the machine base 20 being the center.

The relative coordinate system is an XY-coordinate system in which, at the current position (present time), the directional axis from the vehicle 10 toward the follow target 70 is the X-axis, or a first axis, and a directional axis orthogonal to the X-axis is a Y-axis, or a second axis. In the present embodiment, the X-axis and the Y-axis intersect with each other at a right angle at the center of the machine base 20, and the intersection is the origin of the XY-coordinate system. The X-coordinates from the origin toward the follow target 70 have positive values.

The memory 66 stores, for example, the immediately preceding 100 positional coordinates on the XY-coordinate system of the follow target 70. When a new piece of data is obtained, the controller 60 discards the oldest one of the 100 data pieces and converts the 100 pieces of positional data containing the newly added piece of positional data into the relative coordinate system at the present time. Such conversion of the relative coordinate system is performed each time the machine base 20 revolves. Accordingly, when the control cycle is 50 ms, the controller 60 is capable of reading out the positional data of a period up to 5000 ms (5.0 s) ago (50 ms×100 times).

The setting of the change point Pc will now be described.

The controller 60 sets the change point Pc to a position that corresponds to one of the pieces of the stored positional data and meets one or more conditions.

Figure 9A:
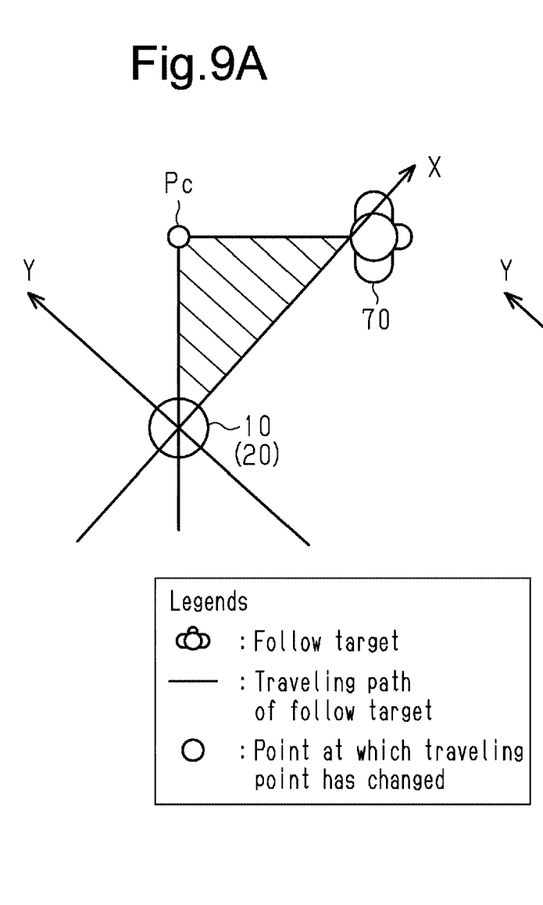
FIG. 9A is a schematic plan view illustrating the position of a change point in a case in which the traveling path of the follow target forms a right angle.
Figure 9B:
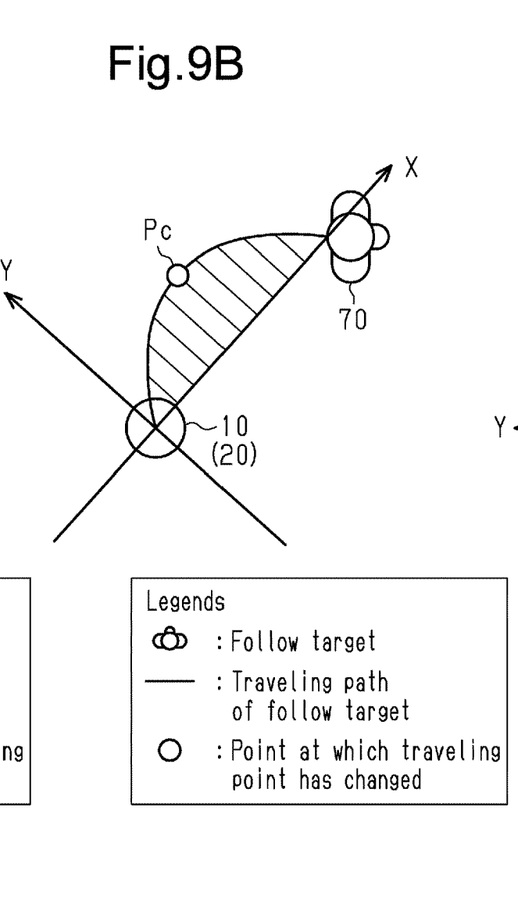
FIG. 9B is a schematic plan view illustrating the position of a change point in a case in which the traveling path of the follow target forms a curve.

Condition 1 for setting a change point is that the position to be the change point Pc is in front of the machine base 20. In this case, the X-coordinate of the position to be the change point Pc is greater than zero. This applies not only to a case in which the traveling path of the follow target 70 forms a right angle as shown in FIG. 9A, but also to a case in which the traveling path of the follow target 70 forms a curve.

Condition 2 for setting a change point is that the absolute value of the coordinate on the second axis (Y-coordinate) is greater than a threshold D. The threshold D can be set to 0.6 m, for example. In this case, when a position at which |Y-coordinate|>0.6, that is, the absolute value of the Y-coordinate is greater than the threshold Dm is detected, that position is a candidate for the change point Pc. That is, positions at which the absolute value of the Y-coordinate is greater than the threshold Dm are validated as candidates for the change point Pc, and positions at which the absolute value of the Y-coordinate is smaller than or equal to the threshold Dm are excluded from candidates for the change point Pc. In other words, when a change in the traveling direction of a follow target is recognized, the change is invalidated if its value is smaller than or equal to the threshold Dm.

Figure 9C:
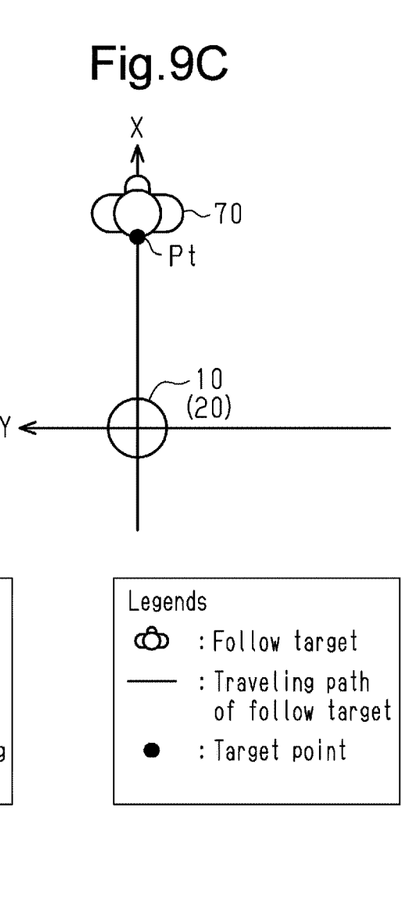
FIG. 9C is a schematic plan view illustrating a case in which there is no change point on the traveling path of the follow target.

When the follow target 70 is advancing in a straight line as shown in FIG. 9C, Condition 2 is not met since the Y-coordinates of the past positional data are all smaller than or equal to 0.6 m. Accordingly, the target point Pt for traveling of the vehicle 10 is the follow target 70.

Figure 10:
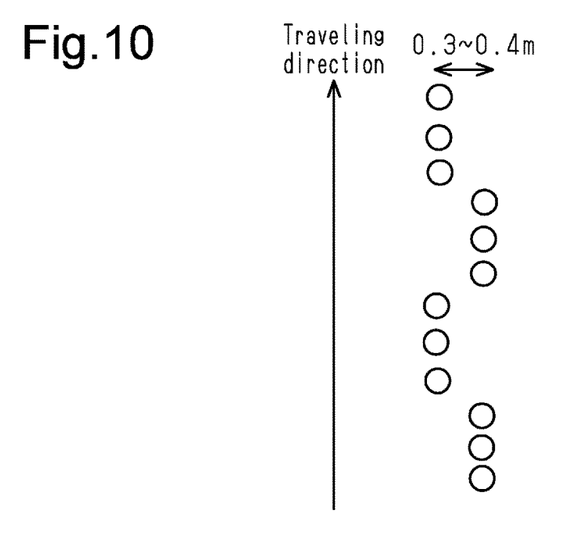
FIG. 10 is a schematic plan view illustrating the detection result of the sensor in a case in which a follow-target person has walked in a straight line.

The threshold is set to 0.6 m for the following reason. There may be a case in which the sensor 65 successively detects the leg on the rear side of the follow-target person who is walking. In this case, even if the follow target 70 advances in a straight line as shown in FIG. 10, the Y-coordinate varies by 0.3 to 0.4 m depending on whether the right leg or the left leg is detected. Thus, the follow target 70 appears to be moving in a zig-zag manner from the machine base 20. Without a threshold, the machine base 20 would move in a zig-zag manner even if the follow target 70 moves in a straight line. To avoid such unnecessary changes in the traveling direction, the threshold Dm is set to 0.4+α (margin α=0.2 m). Therefore, when the follow target 70 is a vehicle, which can travel in a straight line, the threshold Dm may be a smaller value. Alternatively, the threshold Dm (condition 2) may be omitted.

Figure 11:
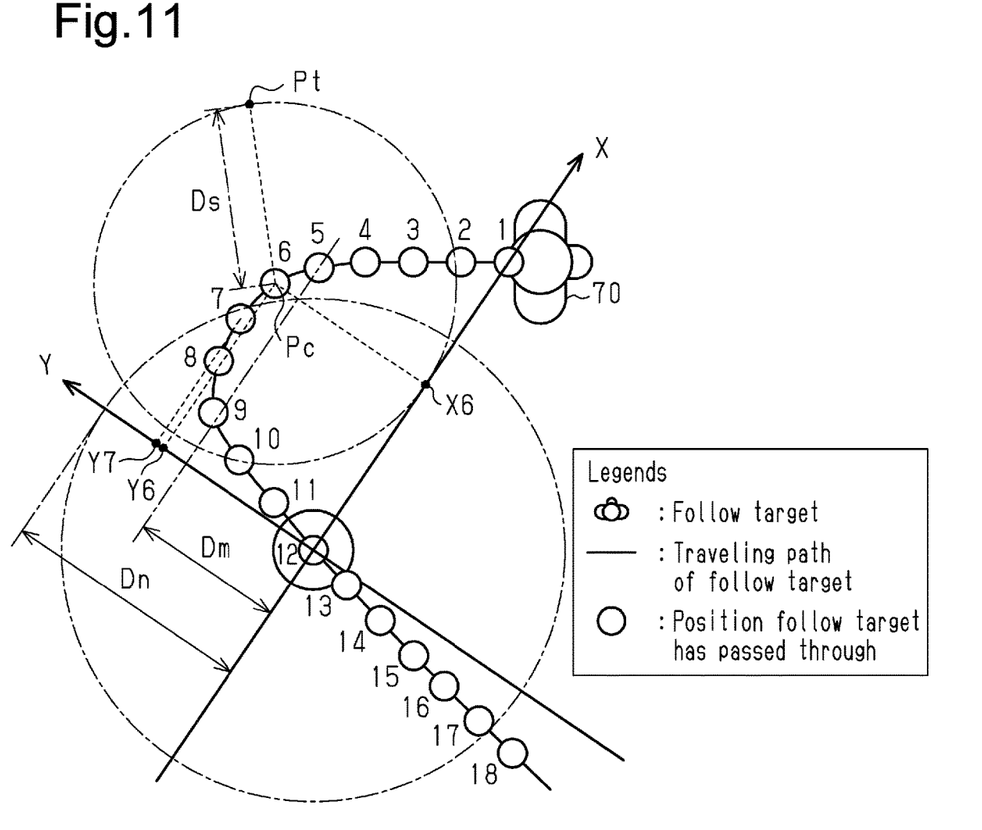
FIG. 11 is a schematic plan view illustrating the setting of a change point.

Condition 3 for setting a change point is that the absolute value of the coordinate on the second axis (Y-coordinate) of the position is the greatest. For example, on the XY-coordinate system shown in FIG. 11, the absolute value of the Y-coordinate of Position 7 (Y7) is the greatest. Position 7 is thus a candidate for the change point Pc.

Condition 4 for setting a change point may be used. Condition 4 is that, when setting a change point Pc, the distance between the vehicle 10 and the change point Pc to be set is greater than or equal to a predetermined distance Dn. The predetermined distance Dn may be, for example, 1 m. For example, on the XY-coordinate system shown in FIG. 11, the distances between Positions 7 to 17 and the vehicle 10 are smaller than Dn. These positions are thus excluded from candidates for the change point Pc. Position 18 and the positions before position 18 do not meet Condition 1 (X>0). Among the remaining Positions 1 to 6, the absolute value of the Y-coordinate of Position 6 (Y6) is the greatest. Position 6 thus meets Condition 3.

Since the X-coordinate of Position 6 (X6) is greater than 0, Position 6 meets Condition 1. Since the Y-coordinate of position 6 (Y6) is greater than the threshold Dm, Position 6 meets Condition 2. In the example shown in FIG. 11, Position 6, which meets all Conditions 1 to 4, is determined to be the change point Pc.

The setting of the target point Pt based on the change point Pc will now be described.

When the change point Pc on the traveling path of the follow target 70 is determined, the controller 60 sets the target point Pt based on the change point Pc. Specifically, the controller 60 sets the target point Pt to a position that is advanced from the change point Pc by a specified distance Ds.

Figure 12:
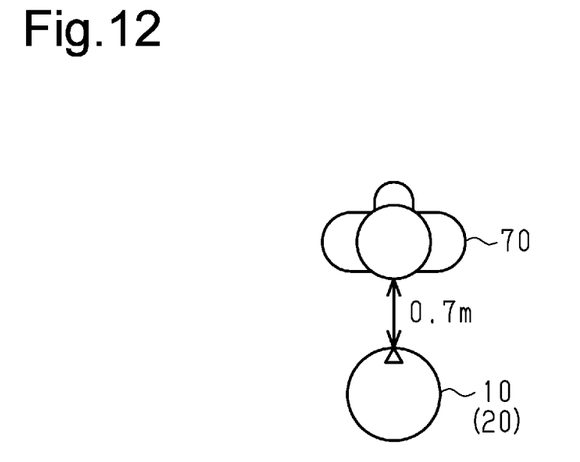
FIG. 12 is a schematic plan view illustrating the smallest distance between the machine base and the follow target.
Figure 13:
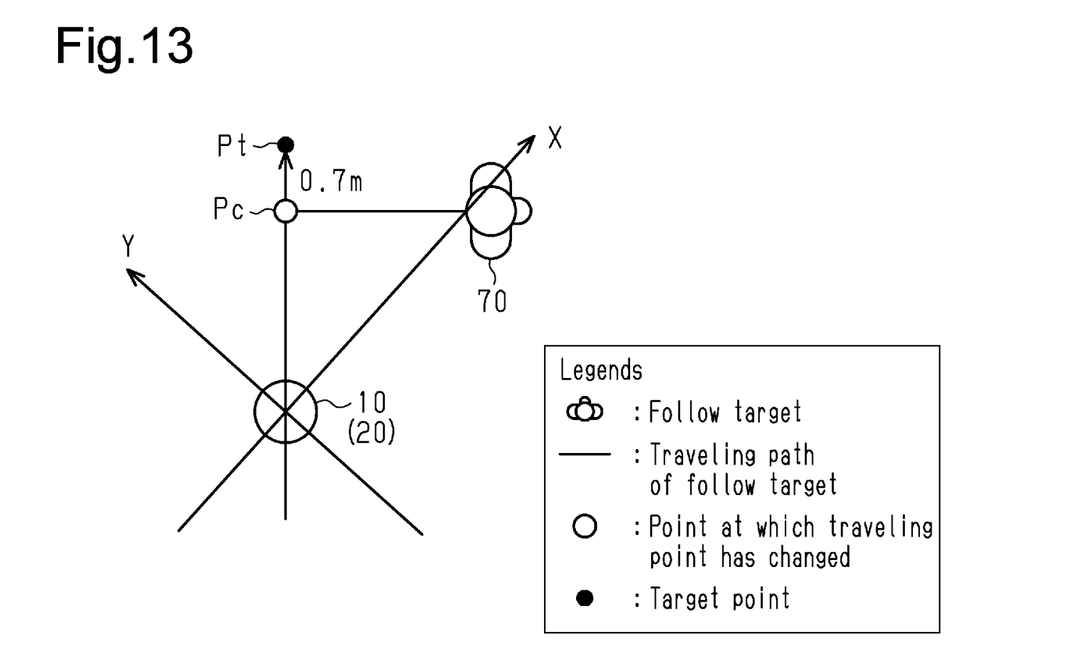
FIG. 13 is a schematic plan view illustrating the setting of a target point based on a change point.

The specified distance Ds may be, for example, 0.7 m. The target point Pt is set to a point that is advanced from the change point Pc by the specified distance Ds for the following reason. In the present embodiment, the machine base 20 follows the follow target 70 with at least a 0.7 m clearance from the follow target 70 as shown in FIG. 12. Thus, if the target point Pt is set to the change point Pc, the machine base 20 will change the traveling direction at a position 0.7 m short of the target. Accordingly, if the target point Pt is set to a position that is advanced from the change point Pc by another 0.7 m as shown in FIG. 13, the machine base 20 can change the traveling direction at the change point Pc. The target point Pt is set on an extension of the straight line connecting the current position of the machine base 20 and the change point Pc.

The controller 60 may change the traveling speed of the vehicle 10 when the vehicle 10 moves toward the target point Pt, which has been set based on the change point Pc.

Figure 14:
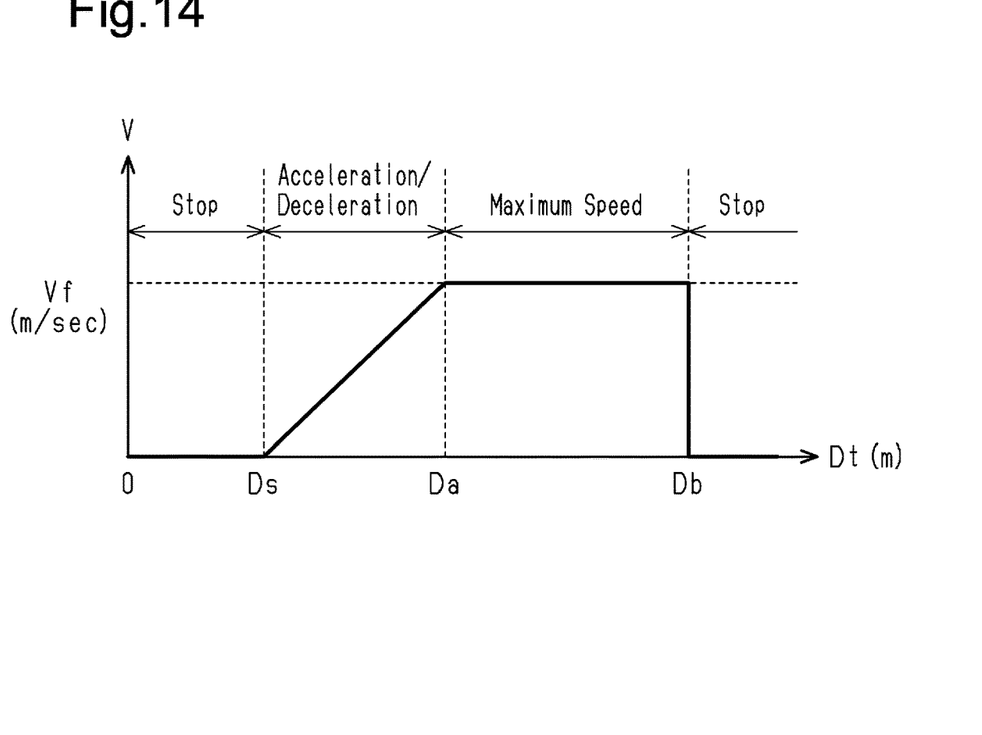
FIG. 14 is a graph showing the relationship between the traveling speed of the vehicle of FIG. 1 and the distance from the vehicle to a target point.

For example, as shown in FIG. 14, when the distance Dt to the target point Pt is greater than the specified distance Ds and smaller than or equal to a speed determination distance Da (specified distance Ds<Dt≤speed determination distance Da), the vehicle 10 may travel toward the target point Pt at a higher speed v as the distance Dt to the target point Pt increases. The speed determination distance Da may be, for example, 1.8 m.

In addition, when the distance Dt to the target point Pt is greater than the speed determination distance Da and smaller than or equal to a stopping determination distance Db (speed determination distance Da<Dt≤stopping determination distance Db), the vehicle 10 may travel toward the target point Pt at a constant speed Vf equal to that in a case in which the distance Dt to the target point Pt is equal to the speed determination distance Da. The stopping determination distance Db may be, for example, 3 to 10 m. The maximum speed of the speed Vf may be, for example, 2.2 m/sec. In this example, the specified distance Ds<the speed determination distance Da<the stopping determination distance Db.

The vehicle 10 may stop traveling toward the target point Pt when the distance Dt from the vehicle 10 to the target point Pt is smaller than or equal to the specified distance Ds (Dt≤specified distance Ds).

Further, the vehicle 10 may stop traveling toward the target point Pt when the distance Dt from the vehicle 10 to the target point Pt is greater than the stopping determination distance Db (stopping determination distance Db<Dt).

When the distance Dt to the target point Pt is greater than 10 m, it takes more than 4 seconds for the vehicle 10 to reach the change point Pc even if the vehicle 10 advances at the maximum speed Vf (Vf=2.2 m/sec). During this time, if the follow target 70 advances ahead of the change point Pc, the distance to the follow target 70 will be excessively great when the vehicle 10 reaches the change point Pc. For example, the positional data of the 100th detection counting back from the present (5 seconds ago) of the follow target 70 and the current position of the vehicle 10 are so distant from each other that the accurate determination of the change point Pc based on the positional data of the follow target 70 will be difficult. Thus, the vehicle 10 preferably stops when the distance Dt to the target point Pt is greater than the stopping determination distance Db and sets the target point Pt again.

Figure 4:
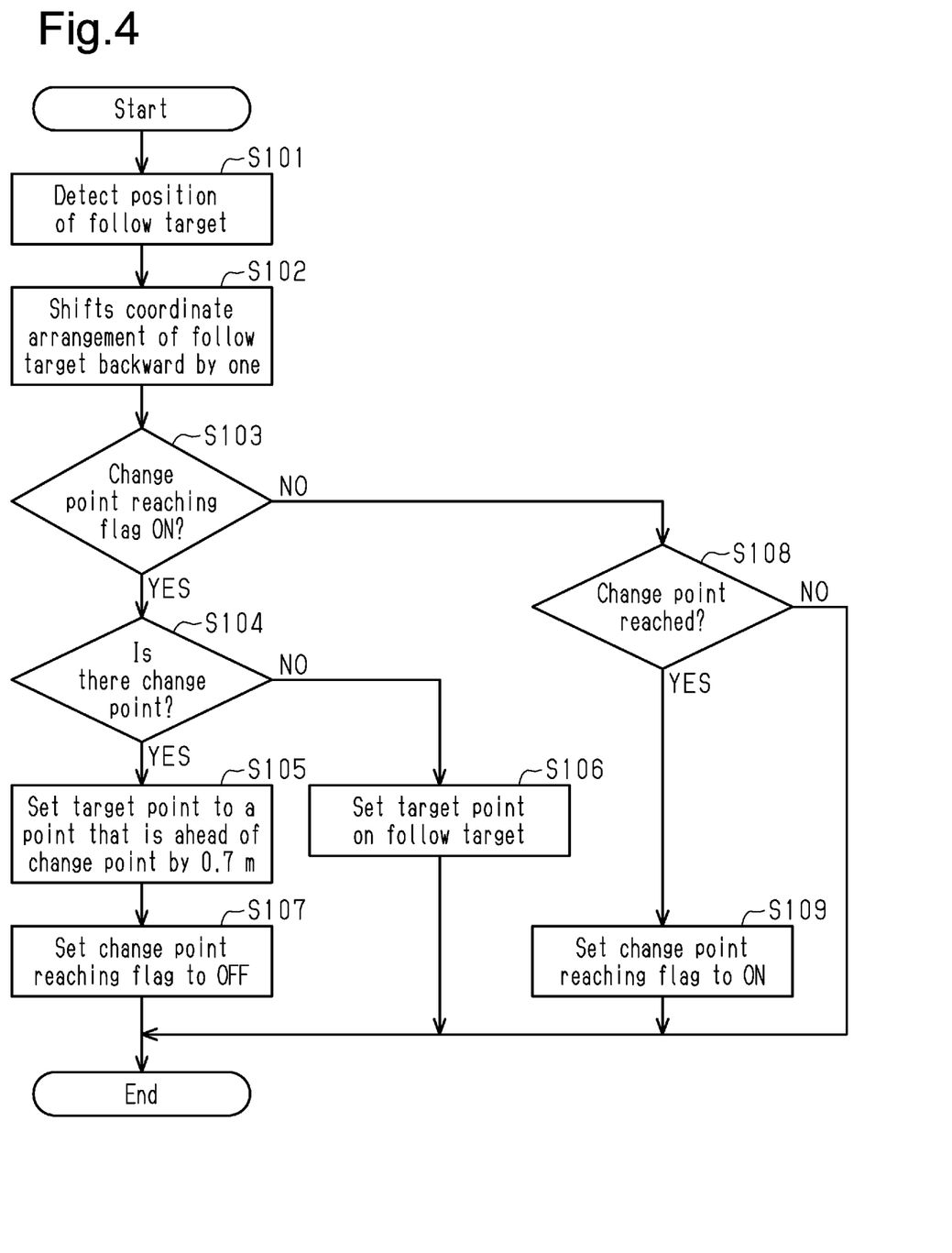
FIG. 4 is a flowchart illustrating an operation of the vehicle of FIG. 1.

After the vehicle 10 is activated, the controller 60 executes the process shown in FIG. 4 at predetermined time intervals, for example, 50 msec. A change point reaching flag is set to ON when the vehicle is activated.

In step S101, the sensor 65 detects the position of the follow target 70. In step S102, the controller 60 shifts the coordinate arrangement of the follow target 70 backward by one. Specifically, the controller 60 stores the latest positional data, or the positional coordinates, of the follow target 70, which has been detected in step S101 in the memory 66, and discards the oldest positional data.

In step S103, the controller 60 determines whether the change point reaching flag is ON. If the change point reaching flag is ON, the controller 60 proceeds to step S104. If the change point reaching flag is OFF, the controller 60 proceeds to step S108.

In step S104, the controller 60 determines whether there is a change point Pc based on multiple pieces of positional data of the follow target 70 stored in the memory 66.

Specifically, the controller 60 searches the past positional coordinates of the follow target 70 (for example, 100 times of detection) and determines that there is a change point Pc if there is a position that meets the above-described Conditions 1 to 4.

When there is no change point Pc in step S104, the controller 60 proceeds to step S106 and sets the target point Pt to the follow target 70. When there is a change point Pc in step S104, the controller 60 proceeds to step S105 and sets the target point Pt to a point that is ahead of the change point Pc by 0.7 m. Thereafter, the controller 60 sets the change point reaching flag to OFF in step S107 and ends the process.

The specified distance Ds is not limited to 0.7 m, but may be adjusted. Alternatively, the target point Pt may be set to the change point Pc (specified distance Ds=0). For example, in a state in which the change point reaching flag is OFF, the minimum distance from the machine base 20 to the follow target 70 may be changed from 0.7 m to 0 m, so that the vehicle 10 reaches the target point Pt.

In step S108, the controller 60 determines whether the change point Pc has been reached. When determining that the change point Pc has not been reached, the controller 60 ends the process. In contrast, when determining that the change point Pc has been reached in step S108, the controller 60 proceeds to step S109 and sets the change point reaching flag to ON. Thereafter, the controller 60 ends the process. In step S108, considering errors, the change point Pc may be determined to be reached if the distance from the machine base 20 to the change point Pc is smaller than or equal to 0.1 m.

For example, in the situation shown in FIG. 7A, the process of step S101, step S102, step S103, step S104, step S106, and End is repeatedly executed.

For example, in the situation shown in FIG. 7B, the process of step S101, step S102, step S103, step S104, step S105, step S107, and End is executed. Subsequently, the process of step S101, step S102, step S103, step S108, and End is repeatedly executed. In the situation shown in FIG. 7C, the process of step S101, step S102, step S103, step S108, step S109, and End is executed.

That is, in FIG. 7A, since the traveling direction of the follow target 70 does not change, the target point Pt is set on the follow target 70 (step S106). In FIG. 7B, the traveling direction of the follow target 70 changes, and the target point Pt is set based on the change point Pc (step S105). Further, in FIG. 7C, when the machine base 20 reaches the point (Pc) at which the traveling direction of the follow target 70 has changed (step S108=YES), the target point Pt is set on the follow target 70.

Through the control shown in FIG. 4, the vehicle 10 travels along the substantially the same path along which the follow target 70 has traveled or along a path close to the path along which the follow target 70 has traveled. That is, when turning a corner, the vehicle 10 follows along the traveling path of the follow target 70, but does not directly follow the follow target 70. Since the vehicle 10 follows along the traveling path of the follow target 70, the vehicle 10 does not take a shortcut of the traveling path shown in FIGS. 15, 16A, 16B, 16C, and 16D.

Therefore, the vehicle 10 is prevented from taking a shortcut and hitting an obstacle as shown in FIG. 17. Also, if the follow target 70 avoids a restricted area in a factory while traveling, the vehicle 10 is prevented from accidentally entering the restricted area. Further, the vehicle 10 does not lose sight of the follow target 110 at a blind corner as shown in FIGS. 18A and 18B.

The above-described embodiment has the following advantages.

(1) When recognizing a change in the traveling direction of the follow target 70 based on the detection result of the sensor 65, the controller 60 sets the target point Pt based on the change point Pc. The controller 60 then executes control to restart following the follow target 70 after the vehicle 10 has traveled to the change point Pc as necessary. Since the vehicle 10 travels along the path along which the follow target 70 has traveled, that is, along a path on which there is no obstacle, the vehicle 10 can follow the follow target 70 without being stopped by hitting an obstacle. That is, the vehicle 10 can follow the follow target 70 while following along the traveling path of the follow target 70.

As long as the follow target 70 keeps advancing in the same traveling direction, the vehicle 10 will not be significantly deviated from the traveling path of the follow target 70. However, when the follow target 70 changes the traveling direction, the traveling path of the vehicle 10 may be deviated from the traveling path of the follow target 70. Thus, when the follow target 70 changes the traveling path, the controller 60 changes the target point Pt. Specifically, the controller 60 searches for a point at which the traveling direction of the follow target 70 changes greatly. If the traveling direction is not changed, the controller 60 always sets the target point Pt on the follow target 70. In contrast, when the traveling direction of the follow target 70 is changed, the controller 60 determines a change point Pc and sets the target point Pt based on the change point Pc. Through determination of the target point Pt, which allows for the above-described traveling path following, the vehicle 10 can travel along the traveling path of the follow target 70 without having map information. This configuration is thus advantageous with regard to the cost.

(2) The controller 60 stores multiple pieces of positional data of the follow target 70 in the memory 66 and determines a change point Pc based on the multiple pieces of the positional data. Since the controller 60 is capable of determining a change point Pc based on the positional data, the configuration is practical.

(3) The vehicle 10 includes the omnidirectional wheels 30, 31, 32, 33 and the machine base 20, which changes the position (orientation) such that the follow target 70 is in front of the vehicle 10. The controller 60 selects, as a candidate for a change point Pc, the position at which the absolute value of the Y-coordinate is the greatest among the pieces of the past positional data of the follow target 70. The change point Pc is thus reliably calculated, making the configuration practical.

(4) When recognizing a change in the traveling direction of the follow target 70, the controller 60 invalidates the change if the change is smaller than or equal to the threshold. That is, 0.6 m in the direction of the Y-axis is used as the threshold Dm, and changes greater than the threshold Dm are validated. This prevents erroneous calculation of the change point Pc.

(5) When determining a change point Pc, the position at which the distance to the vehicle 10 is greater than or equal to the predetermined distance Dn is defined as the change point Pc. The change point Pc thus does not need to be determined multiple times when the vehicle 10 advances a distance smaller than the predetermined distance Dn. In a case in which the controller 60 determines a change point Pc multiple times in a short amount of time, calculation for determination takes time. This slows down the traveling speed of the vehicle 10. Accordingly, the vehicle 10 may lose sight of the follow target 70 or go past the change point Pc. Therefore, the change point Pc is set to a position that meets Condition 4. This allows the vehicle 10 to advance along a path close to the traveling path of the follow target 70.

(6) The vehicle 10 stops traveling toward the target point Pt when the distance Dt to the set target point Pt is smaller than or equal to the specified distance Ds. Thus, even if the specified distance Ds>0, the vehicle 10 is prevented from overrunning the change point Pc.

(7) When the distance Dt to the target point Pt is greater than the specified distance Ds and smaller than or equal to the speed determination distance Da, the vehicle 10 travels toward the target point Pt at a higher speed v as the distance to the target point Pt increases. Therefore, when the distance Dt to the target point Pt is great, the traveling speed of the vehicle 10 is increased so that the vehicle 10 travels quickly. Also, when the distance Dt to the target point Pt is short, the traveling speed of the vehicle 10 is deceased to prevent overrun.

(8) The vehicle 10 is configured such that, when the distance Dt to the target point Pt is greater than the speed determination distance Da and smaller than or equal to the stopping determination distance Db, the vehicle 10 travels toward the target point Pt at a constant speed Vf equal to that in a case in which the distance Dt to the target point Pt is equal to the speed determination distance Da. This configuration allows the vehicle 10 to travel at the highest speed Vf when Da<Dt≤Db.

(9) The vehicle 10 stops traveling toward the target point Pt when the distance Dt to the target point Pt is greater than the stopping determination distance Db. This prevents the vehicle 10 from advancing in an undesired direction.

(10) Being an omnidirectional vehicle, the vehicle 10 is capable of changing the orientation such that the follow target 70, which advances in a direction different from the vehicle 10, is in front by revolving while advancing toward the set target point Pt. This allows the single sensor 65 to detect the position of the follow target 70.

(11) While the follow target 70 advances in a straight line, that is, while there is no change point Pc, the vehicle 10 travels toward the follow target 70. The vehicle 10 thus can follow the follow target 70. When the follow target 70 changes the traveling direction, the vehicle 10 determines a change point Pc. Then, the vehicle 10 travels toward the target point Pt, which is set based on the change point Pc, so as to change the traveling direction and travel along the traveling path of the follow target 70.

The above-described embodiment may be modified as follows. The features included in the above-described embodiment and the features included in the following modifications can be combined as needed. The features in the following modifications can be combined as needed.

The sensor 65 does not need to be a laser type, but may be, for example, an ultrasonic sensor.

The omnidirectional vehicle does not need to be an omni wheel type, but may be, for example, a Mecanum wheel type or an omni ball type.

The vehicle does not need to be an omnidirectional vehicle.

The invention claimed is:

1. A mobile vehicle comprising:
 one or more wheels;
 a sensor configured to detect a position of a follow target; and
 a controlling section configured to control the one or more wheels based on a detection result of the sensor such that the mobile vehicle follows the follow target, wherein
 the controlling section is configured to:
  store in a memory pieces of positional data of the follow target that have been detected by the sensor at predetermined time intervals,
  determine a change point at which a traveling direction of the follow target has changed based on the pieces of the stored positional data, and
  set a target point based on the change point,
 the change point is a position that corresponds to one of the pieces of the stored positional data and meets one or more conditions,
 a coordinate system is defined in which a directional axis from the mobile vehicle toward the follow target is a first axis, and a directional axis orthogonal to the first axis is a second axis, and
 the one or more conditions include a condition that an absolute value of a coordinate on the second axis is greatest on the coordinate system.

2. The mobile vehicle according to claim 1, wherein
 a coordinate system is defined in which a directional axis from the mobile vehicle toward the follow target is a first axis, and a directional axis orthogonal to the first axis is a second axis, and
 the controlling section excludes, from candidates for the change point, a position at which an absolute value of a coordinate on the second axis is smaller than or equal to a threshold on the coordinate system.

3. The mobile vehicle according to claim 1, wherein
 the controlling section is configured to determine that the change point is a position that corresponds to one of the pieces of the stored positional data and meets one or more conditions,
 a coordinate system is defined in which a directional axis from the mobile vehicle toward the follow target is a first axis, and a directional axis orthogonal to the first axis is a second axis, and
 the one or more conditions include a condition that an absolute value of a coordinate on the second axis is greater than a threshold on the coordinate system.

4. The mobile vehicle according to claim 1, wherein the one or more conditions include that a distance from the mobile vehicle is greater than or equal to a predetermined distance.

5. The mobile vehicle according to claim 1, wherein the controlling section is configured to set the target point to a position that is advanced from the change point by a specified distance.

6. The mobile vehicle according to claim 5, wherein the controlling section is configured to stop traveling of the mobile vehicle toward the target point when a distance from the mobile vehicle to the target point is smaller than or equal to the specified distance.

7. The mobile vehicle according to claim 6, wherein the controlling section is configured to cause, when the distance from the mobile vehicle to the target point is greater than the specified distance and smaller than or equal to a speed determination distance, the mobile vehicle to travel toward the target point at a higher speed as the distance to the target point increases.

8. The mobile vehicle according to claim 7, wherein the controlling section is configured to cause, when the distance from the mobile vehicle to the target point is greater than the speed determination distance and smaller than or equal to a stopping determination distance, the mobile vehicle to travel toward the target point at a constant speed equal to that in a case in which the distance to the target point is equal to the speed determination distance.

9. The mobile vehicle according to claim 8, wherein the controlling section is configured to stop traveling of the mobile vehicle toward the target point when the distance from the mobile vehicle to the target point is greater than the stopping determination distance.

10. The mobile vehicle according to claim 1, wherein
the one or more wheels include a plurality of omnidirectional wheels, and
the controlling section is configured to control the omnidirectional wheels such that the follow target is located in front of the mobile vehicle.

11. The mobile vehicle according to claim 1, wherein
the target point is a target point of traveling and is set at a position different from a current position of the follow target so as to cause the mobile vehicle to change the traveling direction at the change point, and
the controlling section is configured to
cause the mobile vehicle to travel toward the follow target when the change point is not determined, and
cause the mobile vehicle to travel toward the target point that is set based on the change point when the change point is determined.

12. A mobile vehicle comprising:
one or more wheels;
a sensor configured to detect a position of a follow target; and
a controlling section configured to control the one or more wheels based on a detection result of the sensor such that the mobile vehicle follows the follow target, wherein
the controlling section is configured to:
store in a memory pieces of positional data of the follow target that have been detected by the sensor at predetermined time intervals,
determine a change point at which a traveling direction of the follow target has changed based on the pieces of the stored positional data, and
set a target point based on the change point,
a coordinate system is defined in which a directional axis from the mobile vehicle toward the follow target is a first axis, and a directional axis orthogonal to the first axis is a second axis, and
the controlling section excludes, from candidates for the change point, a position at which an absolute value of a coordinate on the second axis is smaller than or equal to a threshold on the coordinate system.

13. A mobile vehicle comprising:
one or more wheels;
a sensor configured to detect a position of a follow target; and
a controlling section configured to control the one or more wheels based on a detection result of the sensor such that the mobile vehicle follows the follow target, wherein
the controlling section is configured to:
store in a memory pieces of positional data of the follow target that have been detected by the sensor at predetermined time intervals,
determine a change point at which a traveling direction of the follow target has changed based on the pieces of the stored positional data, and
set a target point based on the change point,
the change point is a position that corresponds to one of the pieces of the stored positional data and meets one or more conditions,
a coordinate system is defined in which a directional axis from the mobile vehicle toward the follow target is a first axis, and a directional axis orthogonal to the first axis is a second axis, and
the one or more conditions include a condition that an absolute value of a coordinate on the second axis is greater than a threshold on the coordinate system.

* * * * *